(12) United States Patent
Kujawa et al.

(10) Patent No.: US 9,658,478 B2
(45) Date of Patent: May 23, 2017

(54) LAMINATED GLAZING WITH VARIABLE LIQUID-CRYSTAL-INDUCED SCATTERING, AND PROCESS AND DEVICE FOR MANUFACTURING IT

(75) Inventors: Jean Kujawa, Attainville (FR); Serge Vila, Soissons (FR)

(73) Assignee: Cardinal IG Company, Eden Prairie, MN (US)

( * ) Notice: Subject to any disclaimer, the term of this patent is extended or adjusted under 35 U.S.C. 154(b) by 1001 days.

(21) Appl. No.: 13/806,489

(22) PCT Filed: Jun. 27, 2011

(86) PCT No.: PCT/FR2011/051480
§ 371 (c)(1),
(2), (4) Date: Feb. 21, 2013

(87) PCT Pub. No.: WO2011/161391
PCT Pub. Date: Dec. 29, 2011

(65) Prior Publication Data
US 2013/0141656 A1    Jun. 6, 2013

(30) Foreign Application Priority Data
Jun. 25, 2010 (FR) .................................. 10 55103

(51) Int. Cl.
*G02F 1/1335* (2006.01)
*G02F 1/1345* (2006.01)
(Continued)

(52) U.S. Cl.
CPC .... *G02F 1/13306* (2013.01); *B32B 17/10036* (2013.01); *B32B 17/10302* (2013.01);
(Continued)

(58) Field of Classification Search
CPC combination set(s) only.
See application file for complete search history.

(56) References Cited

U.S. PATENT DOCUMENTS

| 4,435,047 A | 3/1984 | Fergason |
| 4,732,456 A | 3/1988 | Fergason et al. |
| (Continued) | | |

FOREIGN PATENT DOCUMENTS

| CN | 1469962 A | 1/2004 |
| EP | 0 238 164 | 11/1993 |
| (Continued) | | |

OTHER PUBLICATIONS

International Search Report as issued for International Application No. PCT/FR2011/051480, dated Sep. 27, 2011.
(Continued)

*Primary Examiner* — Wen-Ying P Chen
(74) *Attorney, Agent, or Firm* — Fredrikson & Byron, P.A.

(57) ABSTRACT

A laminated glazing with variable liquid-crystal-induced scattering, includes a first glass sheet; a first interlayer film for laminating the first glass sheet, made from a first plastic material; an electrically controllable, variable scattering system including the liquid crystals between a first support for a first electrode and a second support for a second electrode, the electrodes making contact with the liquid crystals; a second interlayer film, made from a second plastic material for laminating a second glass sheet; links to the electrodes; electrical wiring with two wiring inputs; a polymer material, for protecting the wiring inputs, which makes contact with the glass sheets; and a seal for sealing the liquid crystals and the electrodes from water. The protective polymer material forms a seal for sealing the electrode links and the wiring inputs from liquid water.

20 Claims, 9 Drawing Sheets

(51) Int. Cl.
    *G02F 1/1339*     (2006.01)
    *G02F 1/133*     (2006.01)
    *B32B 17/10*     (2006.01)
    *G02F 1/1333*     (2006.01)

(52) U.S. Cl.
    CPC .. *B32B 17/10504* (2013.01); *B32B 17/10788* (2013.01); *G02F 1/1345* (2013.01); *B32B 17/10293* (2013.01); *B32B 17/10376* (2013.01); *G02F 1/1339* (2013.01); *G02F 1/13452* (2013.01); *G02F 2001/133325* (2013.01); *Y10T 29/49* (2015.01)

(56) References Cited

U.S. PATENT DOCUMENTS

| | | |
|---|---|---|
| 4,806,922 A | 2/1989 | McLaughlin et al. |
| 5,142,406 A | 8/1992 | Lampert et al. |
| 5,408,353 A | 4/1995 | Nichols et al. |
| 5,640,274 A | 6/1997 | Iwama et al. |
| 5,686,017 A | 11/1997 | Kobayashi et al. |
| 5,958,290 A | 9/1999 | Coates et al. |
| 6,271,899 B1 | 8/2001 | Lewis et al. |
| 6,280,041 B1 * | 8/2001 | Unger .................. G02F 1/161 359/265 |
| 6,295,102 B1 | 9/2001 | Higa et al. |
| 6,317,248 B1 | 11/2001 | Agrawal et al. |
| 6,429,961 B1 | 8/2002 | Harary et al. |
| 6,661,486 B1 | 12/2003 | Faris et al. |
| 7,342,704 B2 | 3/2008 | Yano |
| 7,525,604 B2 | 4/2009 | Xue |
| 7,755,829 B2 | 7/2010 | Powers et al. |
| 7,837,897 B2 | 11/2010 | Zhang et al. |
| 8,102,478 B2 | 1/2012 | Xue |
| 8,187,682 B2 | 5/2012 | Albrecht et al. |
| 2001/0033400 A1 | 10/2001 | Sutherland et al. |
| 2003/0193709 A1 | 10/2003 | Mallya et al. |
| 2009/0068455 A1 | 3/2009 | Albrecht et al. |
| 2009/0103027 A1 | 4/2009 | Hughes et al. |
| 2009/0219603 A1 | 9/2009 | Xue |
| 2009/0290078 A1 | 11/2009 | Yang et al. |
| 2009/0302760 A1 * | 12/2009 | Tchakarov .......... H01L 51/5203 313/512 |
| 2010/0118380 A1 | 5/2010 | Xue |
| 2010/0279125 A1 | 11/2010 | Buyuktanir et al. |
| 2010/0294679 A1 | 11/2010 | Griffiths et al. |
| 2011/0102730 A1 | 5/2011 | Lee et al. |
| 2013/0093969 A1 | 4/2013 | Li et al. |

FOREIGN PATENT DOCUMENTS

| | | |
|---|---|---|
| EP | 0 630 170 | 12/1994 |
| EP | 1 653 275 | 5/2006 |
| EP | 2128688 A1 | 12/2009 |
| GB | 2 296 479 | 7/1996 |
| JP | H0295321 U | 7/1990 |
| JP | H07186331 A | 7/1995 |
| JP | H10253995 A | 9/1998 |
| JP | 2004004277 A | 1/2004 |
| JP | 2004504630 A | 2/2004 |
| JP | 2007004083 A | 1/2007 |
| JP | 2012030980 A | 2/2012 |
| WO | WO 92/19695 | 11/1992 |

OTHER PUBLICATIONS

English translation of the International Preliminary Report on Patentability with Written Opinion of the International Searching Authority of Intl. Pat. App. No. PCT/FR2011/051480 (WO2011161391) dated Dec. 25, 2012, 8 pages, European Patent Office as International Searching Authority for the International Bureau of WIPO, Rijswijk, The Netherlands.

English translation of Search Report and Office Action issued for corresponding Chinese Pat. App. No. 2011840602 (Pub. No. CN103069333A) on Feb. 11, 2015, 12 pages, The State Intellectual Property Office of People's Republic of China, Beijing, China.

English translation of Search Report and Notification of Reasons for Refusal issued for corresponding Japanese Pat. App. No. 2013-515949 (Pub. No. JP2013531276A) on Mar. 3, 2013, 23 pages, Japanese Patent Office, Tokyo, Japan.

Chen et al., "Electro-Optical Properties of Polymer Stabilized Cholesteric Texture Normal-Mode Light Shutter From Flexible Monomers," ALCOM Tech Report XI, 2000, pp. 223-229.

"Liquid Crystal Glass," retrieved from http://www.glazette.com/Glass-Knowledge-Bank-70/Liquid-Crystal-Glass.html on October 1, 2013, 2 pages.

"Switchable Intelligent Glass—SGG Priva-lite Electrochromatic Glass," Saint Gobain Glass India, retrieved from http://in.saint-gobain-glass.com/b2c/default.asp?nav1=pr&nav2=single%20pane&id=18978 on Oct. 1, 2013, 1 page.

"Transparent Display," Kent Optronics, retrieved from http://kentoptronics.com/transparent.html on Oct. 1, 2013, 1 page.

* cited by examiner

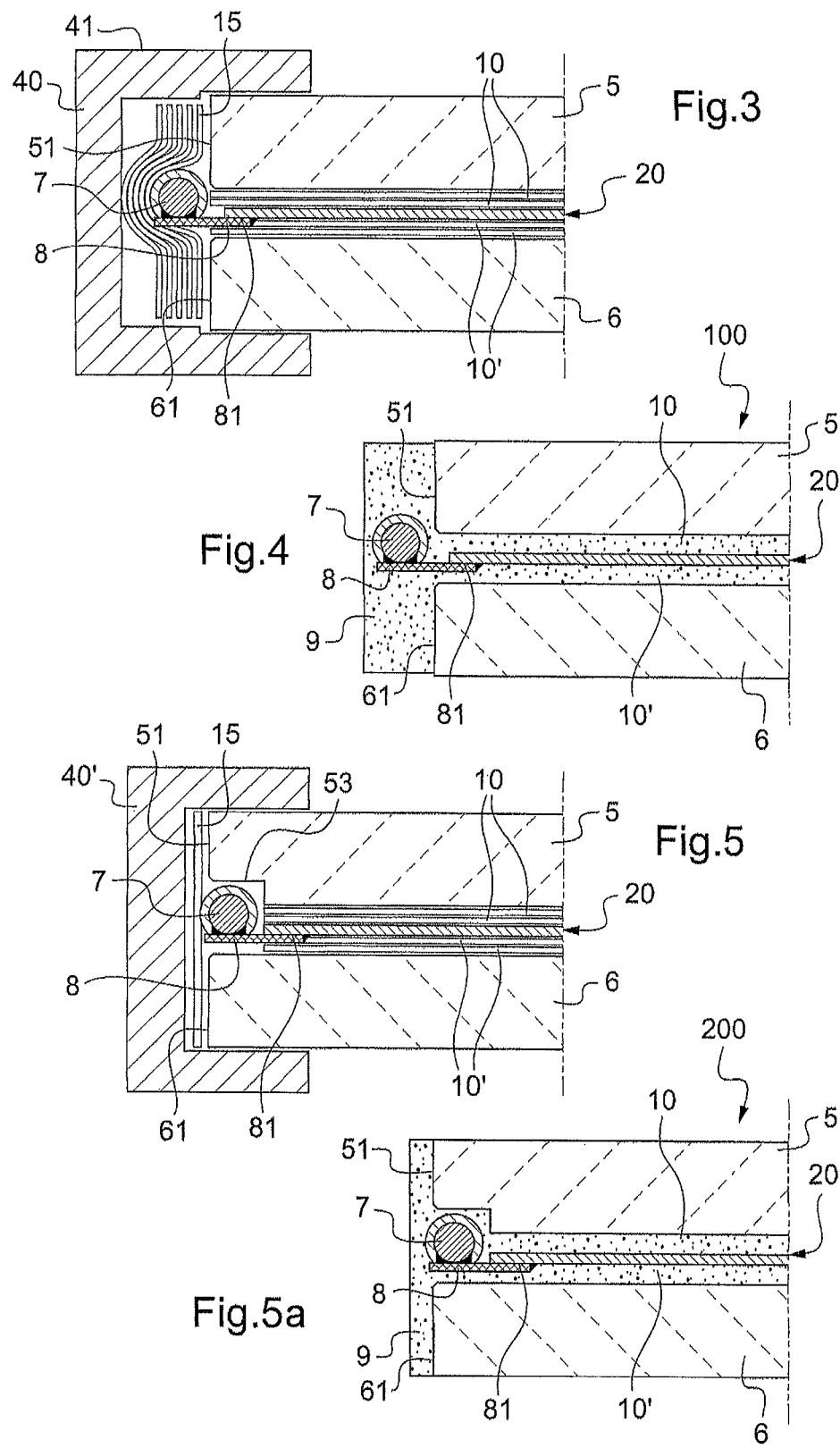

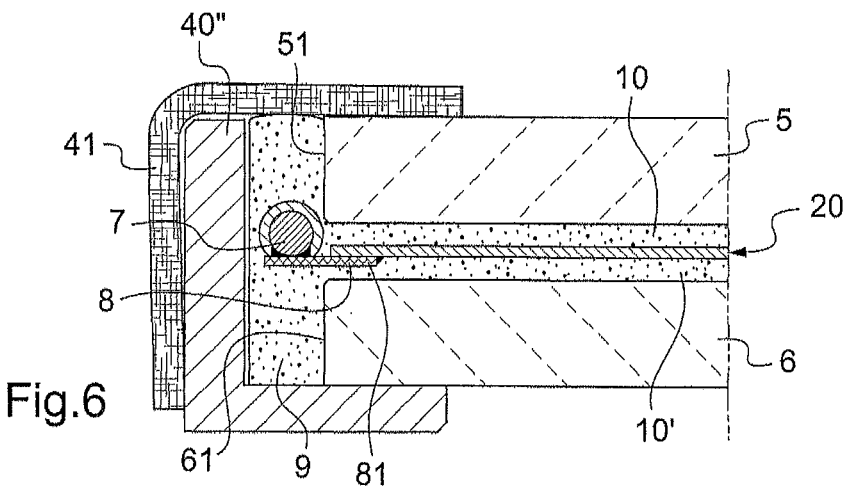
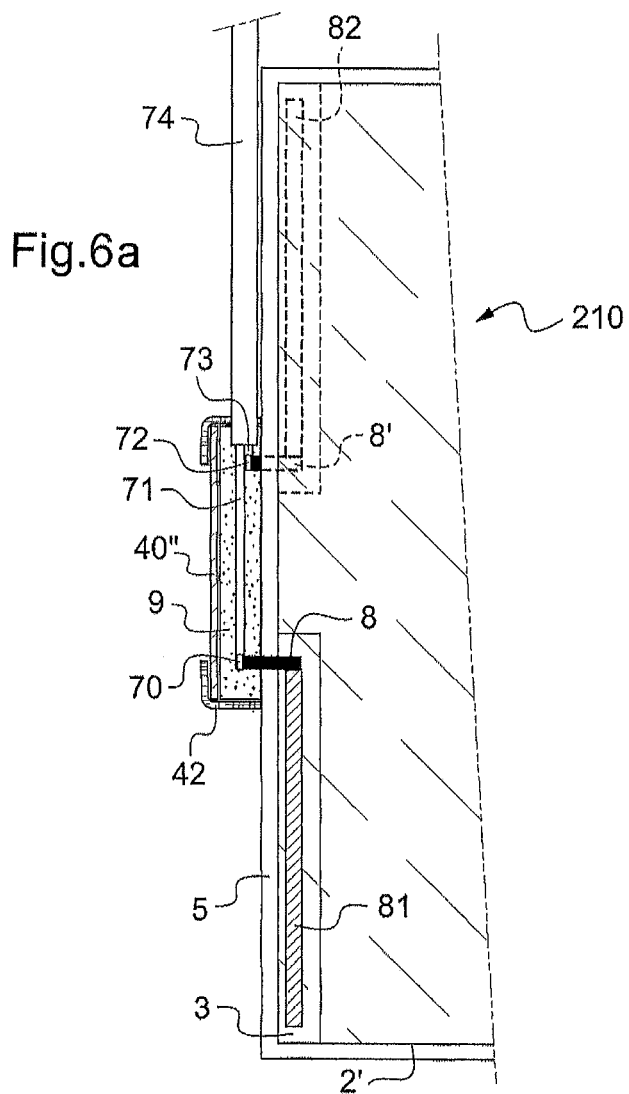

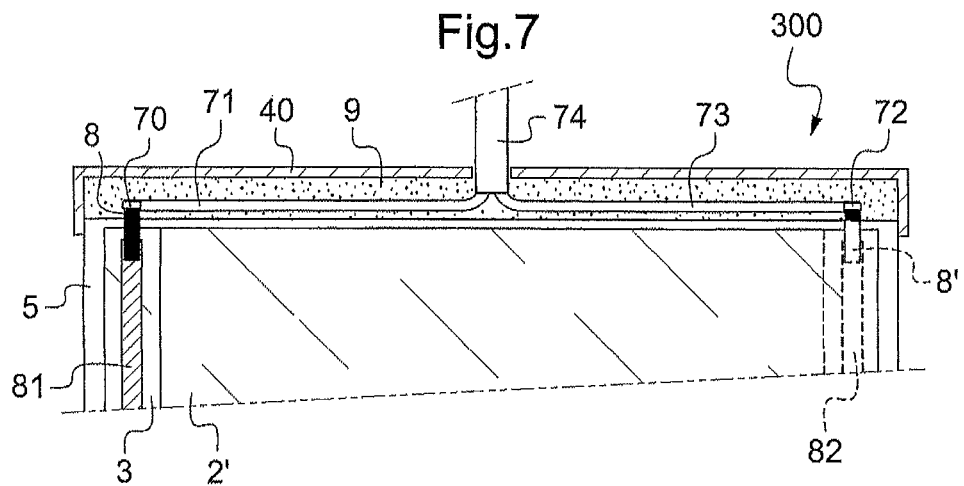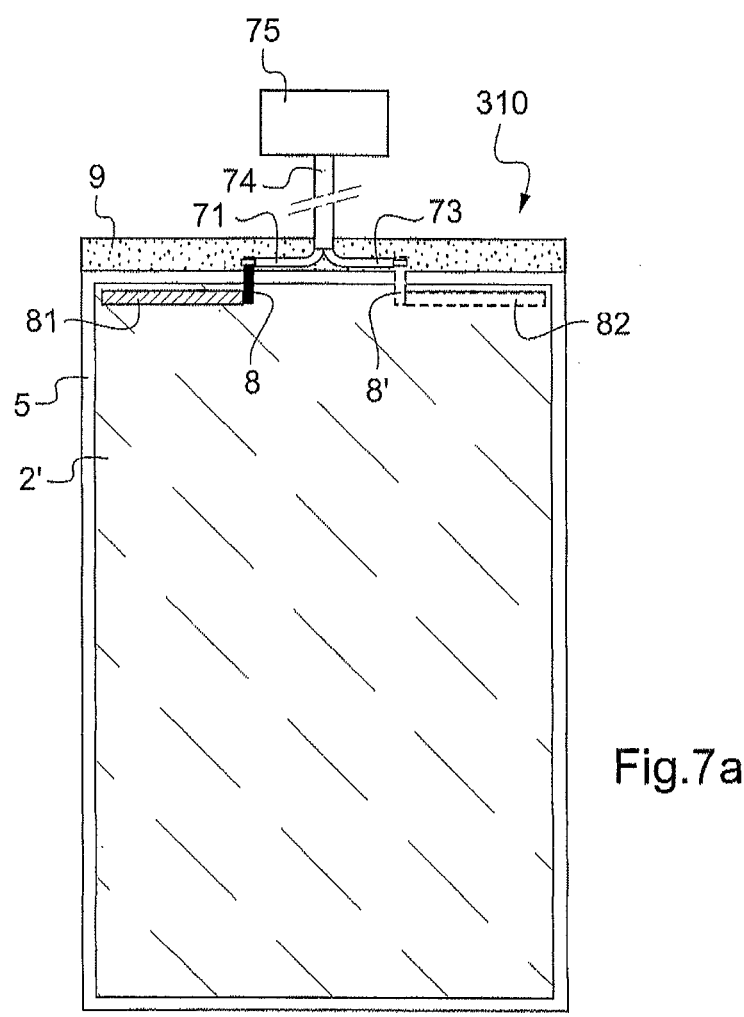

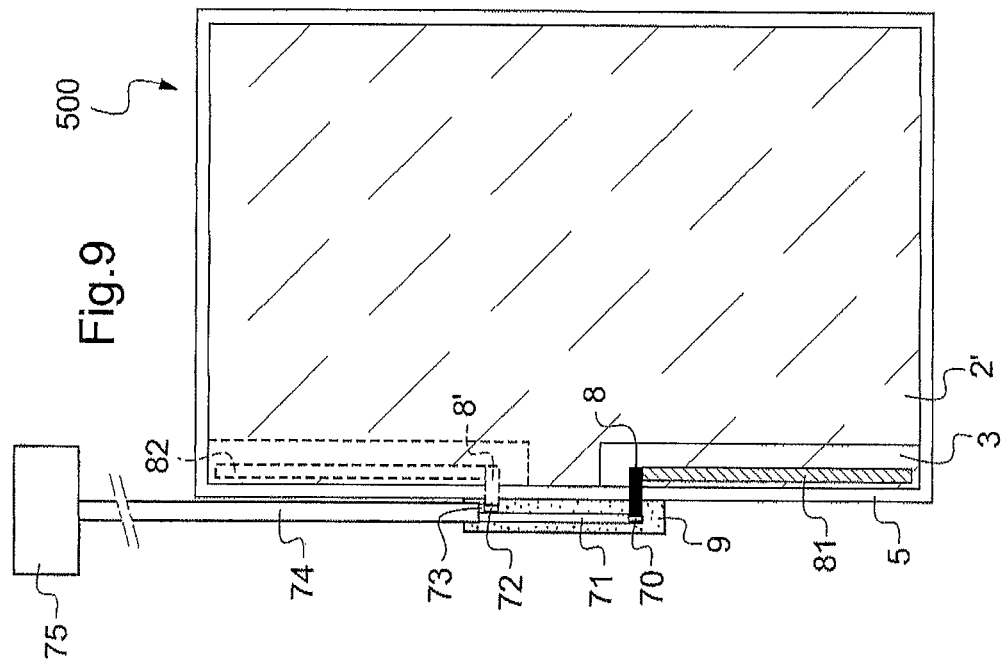
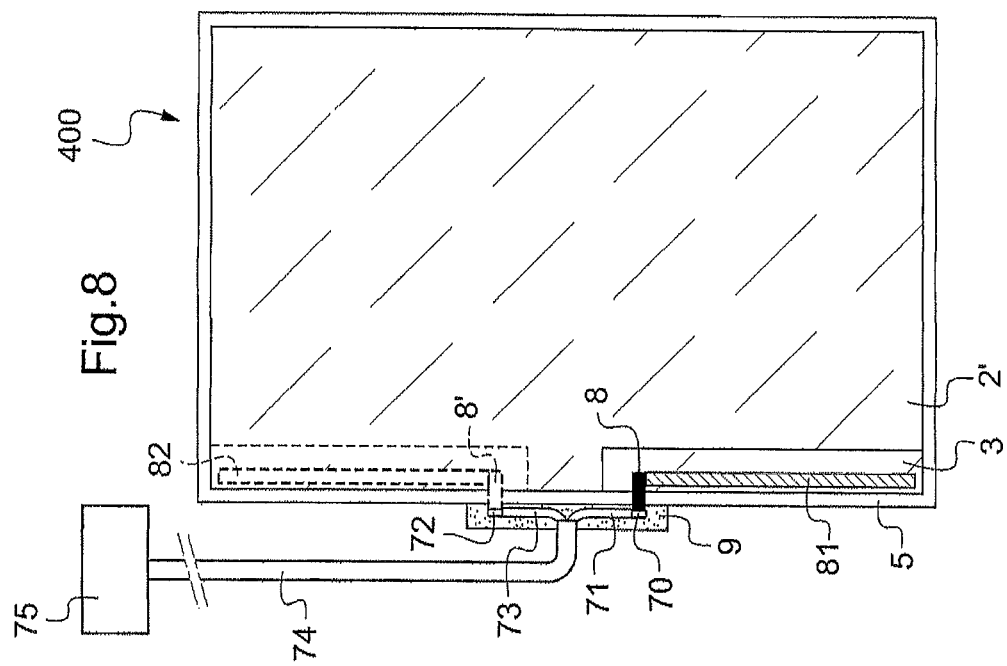

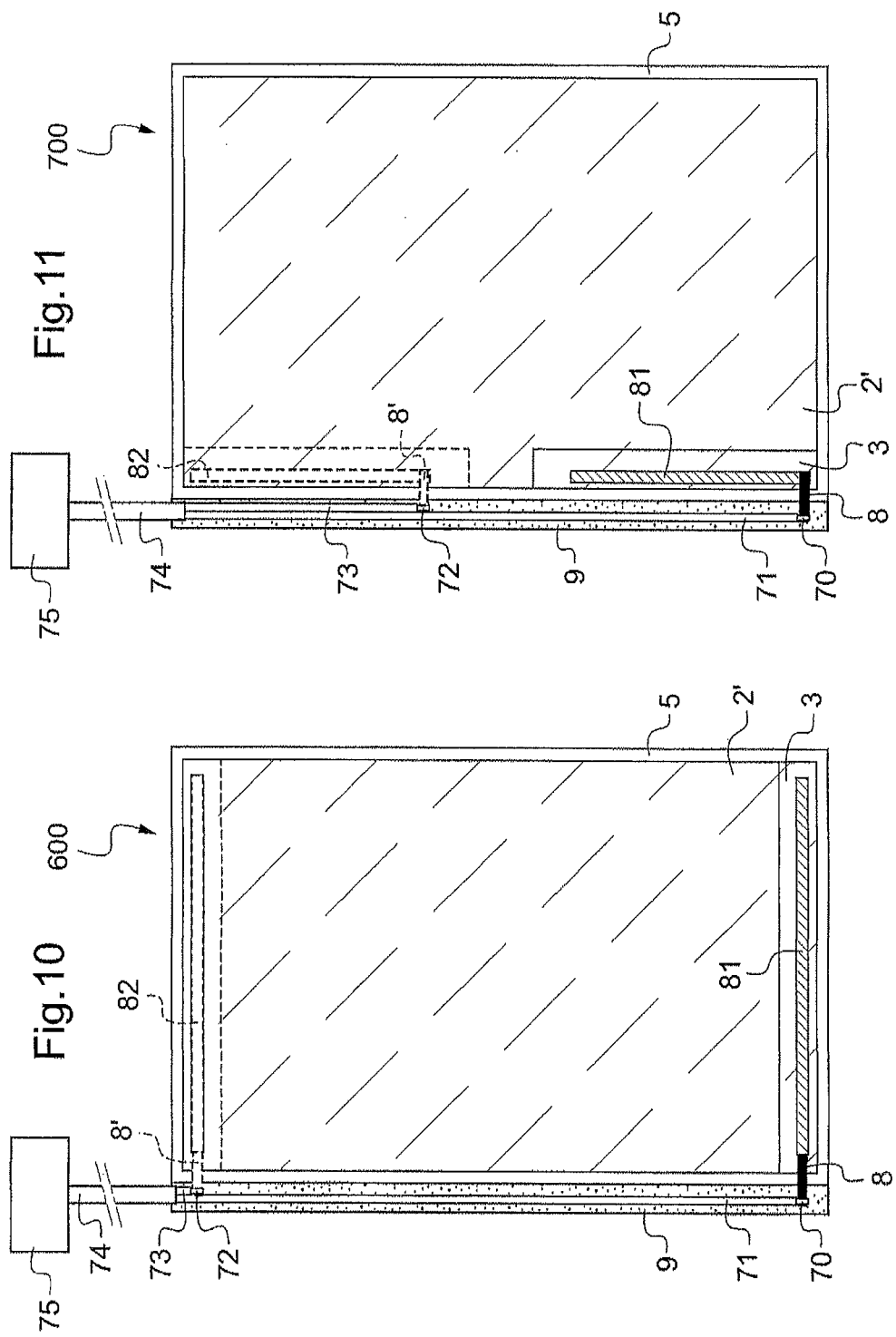

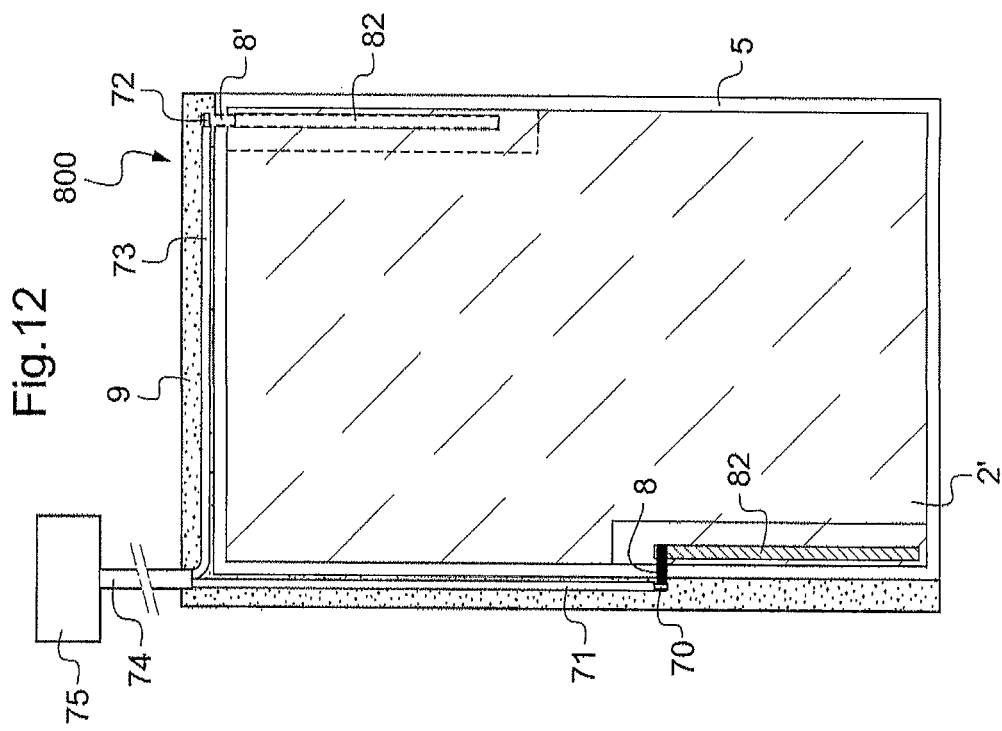
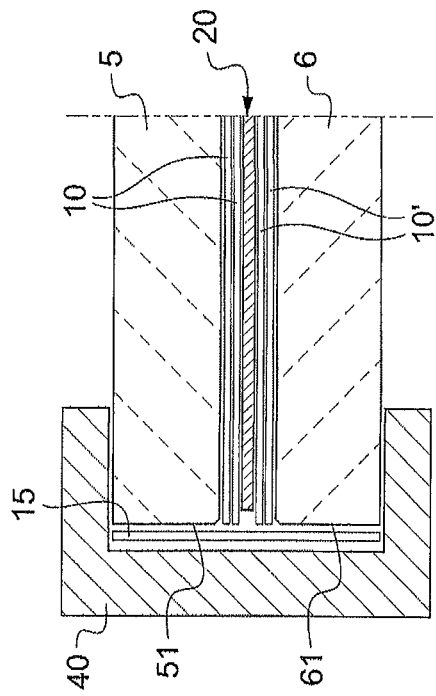
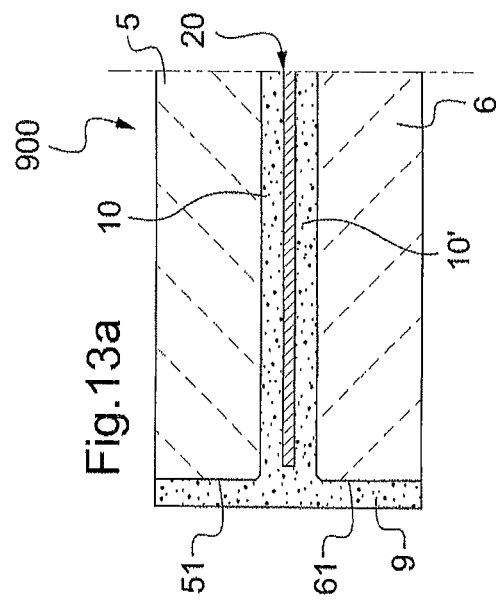

LAMINATED GLAZING WITH VARIABLE LIQUID-CRYSTAL-INDUCED SCATTERING, AND PROCESS AND DEVICE FOR MANUFACTURING IT

CROSS-REFERENCE TO RELATED APPLICATIONS

This application is the U.S. National Stage of PCT/FR2011/051480, filed Jun. 27, 2011, which in turn claims priority to French Application No. 1055103, filed Jun 25, 2010. The content of these applications are incorporated herein by reference in their entirety.

The invention relates to the field of electrically controllable glazing with variable optical properties and more particularly relates to laminated glazing with liquid-crystal-induced scattering, and its manufacturing process, and the device for manufacturing it.

Glazings are known certain properties of which may be modified under the effect of an appropriate electrical stimulus, especially the transmittance, absorbance and reflectance at certain electromagnetic radiation wavelengths, especially in the visible and/or in the infrared, or else the scattering of light.

It is especially desired to control the degree of vision through a glazing unit, especially to reduce or even completely prevent it for a certain time.

One type of glazing with variable light scattering properties, the operating principle operation of which is known, is liquid-crystal glazing. It is based on the use of a film, placed between two conductive films forming the electrodes, which is in turn based on a polymer material in which liquid-crystal droplets are dispersed, especially nematic liquid crystals with positive dielectric anisotropy. The liquid crystals, when a voltage is applied to the film, align along a preferred axis, thereby enabling vision. Without a voltage, in the absence of alignment of the crystals, the film becomes scattering and prevents vision. Examples of such films are especially described in European patent EP 0 238 164, and U.S. Pat. Nos. 4,435,047, 4,806,922, and 4,732,456. This type of film, once laminated and incorporated between two glass substrates, is marketed by Saint-Gobain Glass under the trade name Privalite.

Such Privalite glazing is used as internal partitions between two rooms, in a building, or between two compartments in a means of transportation such as a train or plane. They are also used in vehicle rear-view mirrors which, by darkening when required, stop the driver from being dazzled. In a sufficiently scattering state, they are also used as projector screens.

Known Privalite glazing incorporates the liquid-crystal system between two glass sheets using EVA interlayers. Two electrical wires each have a wiring input connected to a separate electrode link.

To prevent electrocution during handling, each wire input is embedded in a bead of a hot-melt adhesive based on a polyolefin applied hot using a gun.

The object of the present invention is to improve the reliability of laminated glazing with liquid-crystal-induced variable scattering, at the least cost, simply and durably.

For this purpose, the present invention provides laminated glazing with variable liquid-crystal-induced scattering, which comprises:
a first glass sheet;
a first interlayer film for laminating the first glass sheet, made from a first plastic material, especially a thermoplastic material;
an electrically controllable, variable scattering system comprising the liquid crystals between a first support for a first electrode and a second support for a second electrode, the first and second electrodes making contact with the liquid crystals;
a second interlayer film, made from a second plastic material, especially a thermoplastic material, especially of the first type, for laminating a second glass sheet;
first and second links, to the first and second electrodes respectively;
electrical wiring with two wiring inputs, a first wiring input connected to the first link and a second wiring input connected to the second link, especially links protruding at least from the end of the supports, even from the edge of the glazing;
a polymer material, for protecting the first and second wiring inputs, which makes contact with the first and second glass sheets, especially with one of the edges of the first and second glass sheets, over all or part of the edge or edges of said glass; and
a means for sealing the liquid crystals and the first and second electrodes from water, for example comprising the first and second plastic material, the protective polymer material forming a means for sealing the first and second electrode links and the first and second wiring inputs from liquid water, even water vapour.

In the prior art the polyolefin hot-melt adhesive adheres poorly to the glass and, as a result:
preferential pathways are created for the diffusion of liquid water between the resin and the glass, causing damage to the links which spreads to the inputs of the wires; and
there are frequent problems with wires being torn out during fitting of the glazing.

The protective polymer material according to the invention adheres sufficiently to glass, and if necessary to the first and second plastic materials. Furthermore, one or more thin tie films need not be added to the surface of the glass sheet(s) to strengthen the adhesion.

The protective material according to the invention therefore guarantees that the links and the wiring inputs are sealed from liquid water and even water vapour, sealing being very strictly regulated in wet areas especially (bathroom, etc.).

As applications in wet areas (liable to flooding etc.), mention may be made of:
in particular flooring, walls, partitions, doors (optionally sliding doors) and exterior or interior windows in toilets (separate or part of a bedroom or any other room), laundry rooms, drying rooms, bathrooms or shower rooms;
(floor) tiles, walls (sides), windows or changing compartments in swimming pools;
glass wall panels (shop windows or other windows, especially a ground-floor or garden window), especially in areas prone to flooding;
glazing for road, municipal, or coastal signs, especially in areas prone to flooding; in a road near (or next to) the sea, a stream, a river etc.; and
applications in boats.

The protective material according to the invention ensures a better mechanical retention of the electrical wiring, reducing the risk of it being torn from the glazing, and it contributes to the electrical isolation of the links and wiring inputs, optionally in combination with the laminating plastic materials.

The protective material and the first and second plastic materials may advantageously be converted by heat treatment, especially in an oven:
successive conversions during two heat treatments (especially in an oven); or
advantageously, simultaneous conversion (simultaneous or coincident softening, bonding, liquefaction and preferably crosslinking) during a heat treatment (especially in an oven).

The glazing is then more reliable and simpler and quicker to manufacture

The protective material thus used is preferably an extruded bead. The extrusion of a bead would be a difficult step to implement during production (additional steps of applying the bead of extruded adhesive, embedding the wire, drying) and adhesion is not guaranteed.

The protective material is preferably also a solution which consists of a rigid premounted frame that encloses the wiring embedded in an adhesive.

The protective material may advantageously be crosslinked and especially form a three-dimensional network so as to strengthen the seal against liquid water, even water vapour.

The protective material and the laminating plastic materials preferably have the same nature and are therefore (essentially) based on one or more identical or similar polymers.

It is possible for the laminating plastic, especially thermoplastic, materials to be an assembly organic polymer such as ethylene-vinyl acetate (EVA) or else polyvinyl butyral (PVB) or certain polyurethanes (PU).

The protective material, the first and preferably the second plastic, especially thermoplastic, materials may in particular be based on ethylene-vinyl acetate, especially crosslinked ethylene-vinyl acetate, the first and second plastic, especially thermoplastic, materials (preferably PVB, EVA, etc.) being extended by the protective material, thus forming a continuous length of (plastic) material(s).

If the protective material completely surrounds the glazing, it is not necessary for the first and second laminating plastic, especially thermoplastic, materials to form a continuous length of material with the protective material for the lateral seal to be preserved (preventing the passage of water from the sides).

The thickness of the protective material may furthermore be adjusted at the wiring inputs limiting any protrusion, a finer adjustment being possible than with the injected hot-melt resin of the prior art.

The protective material may have what is called an external surface, directed towards the exterior of the glazing, which is moulded.

The external surface may be flat, smooth or intentionally grooved, or serrated. The surface may be profiled, especially to reduce the amount of material used, being outwardly domed for example.

The protective material may furthermore improve the mechanical withstand and retention of the wire and make installation of the glazing easier, especially when the glazing is slid into a frame.

The electrical wiring may comprise a (single) wire that, over at least some of its length located outside of an input region of the wire (stripped-wire region), comprises a sheath (the conventional internal or external sheath of the wire) that makes contact with the protective material and that is held fast in the protective material (even embedded in this material) even also held fast in the first and/or second plastic, especially thermoplastic, material(s)—especially a polyvinyl chloride (PVC) sheath which adheres particularly well to EVA.

PVC adheres well to EVA. Conversely, a non-stick material is avoided, especially a fluorocompound (Teflon i.e. polytetrafluoroethylene), especially when the protective material is made from EVA.

Alternatively, a sheath that is bonded to the protective material sufficiently to immobilize the wiring as best as possible, and prevent it from being torn out, may be provided.

The thickness of the protective material is for example substantially equal to the diameter of the wire, for example about 5 mm.

The electrical wiring may furthermore comprise a (single) wire that extends along the edge of the glazing, especially along only one edge face. Over at least some of its length located outside of an input region of the wire, the wire, with or without an external sheath, is covered by, especially embedded in, said protective material and even by the first and/or the second plastic, especially thermoplastic, material.

Preferably the wire is covered over the entire length of the glazing for its protection and/or immobilization.

The electrical wiring may comprise (alternatively or additionally) a wire that extends along a peripheral groove between the first and second glass sheets. Over at least some of its length located outside of the input region of the wire, the wire, with or without an external sheath, is covered by, especially embedded in, said protective material and even by the first and/or second plastic, especially thermoplastic, material.

Preferably, the wire is covered over the entire length of the groove in the glazing for its protection and/or immobilization.

A groove may therefore be provided between the glass sheets by creating a step in at least one of the glass sheets and inserting the wiring in this groove, the wiring then lying flush with or set back from the edge of the glazing.

The wire or wires of the wiring may otherwise lie along the edge face(s) of the glazing: against the edge or away from the edge (making it easier to embed the wiring).

Advantageously, the electrical wiring may comprise a (single) wire fixed in a defined unidirectional position (especially in a straight line, especially along the edge or groove) at least outside of the wire input covered with the protective material (even embedded therein).

Preferably the cable is unidirectional over the entire length (of the groove) of the glazing for its protection and/or its immobilization (outside of the input and/or output region, if required)

The unidirectionality may be ensured by the protective material which may initiate a preferred direction in the wiring input region. The protective material may even extend beyond this input region so as to guide the wire.

Thus, a U is preferably not formed (preferably an L is), even after connection to a general electricity supply (mains, etc.)

Any damage to the wire caused by bending, during transportation, installation or removal (for repair etc.), is therefore prevented.

Thus, in a first unidirectional configuration, the electrical wiring comprises a (single) wire the input of which is at the end likely to be, after fitting of the glazing, the top or bottom end, respectively (position relative to the floor) of the edge of the glazing or of a peripheral groove between the first and second glass sheets, and outside of the region of the wire embedded especially in the protective material, the wire runs unidirectionally towards the (general) electricity supply, especially towards the ceiling or ground, respectively.

Furthermore, in a second (alternative or additional) unidirectional configuration the electrical wiring comprises a (single) wire the input of which is at the end likely to be, after fitting of the glazing, the lateral end of the edge of the glazing or of a peripheral groove between the first and second glass sheets, and outside of the region of the wire embedded especially in the protective material, the wire is unidirectional.

In corner glazing, the lateral end is in other words vertical (after fitting), and it is longer than, the same length as or shorter than the horizontal end.

Thus, preferably, the wire follows a single edge.

The glazing may be further simplified by forming closely spaced electrode links and furthermore preferably limiting the lengths of wiring. Thus enough space is left to prevent connections, for example soldered connections, between wire inputs and external parts from becoming hot.

In a preferred design, the protective material, even the first and/or the second plastic, especially thermoplastic, material(s), cover(s) continuously the first and second links and the space between the first and second links especially having the form of conductive strips protruding from the glazing and preferably on a single edge of the glazing.

Preferably, the ends of the first and second links are spaced apart by a length, called a separation length, measured along the principle plane of the glazing, which is greater than or equal to 10 cm, even greater than or equal to 15 cm and especially less than 30 cm.

With the hot-melt resin of the prior art a reliable single bead is not possible because increasing the length of a bead increases the likelihood of the bead being torn from the glazing.

The protective material may therefore be localized (at least) only to the region with the closely spaced links, rather than lying in two regions as in the prior art. Typically, the material is (slightly) longer than the region, for example extending at least 1 cm and even 2 cm beyond each side of the links.

In a preferred design, the wiring exits the glazing, not covered by the protective material, in a single region especially a region of a single edge face, and preferably the wiring is formed by a single two-wire cable.

It is furthermore possible to mask the wiring using a protective material that is chosen to be opaque, for example a milky white, by adding if necessary additives to the protective material.

In a first embodiment, the protective material lies along at least (only) one edge face, and/or along a peripheral groove between the first and second glass sheets.

In a second embodiment, to prevent a local protrusion (or even a protruding join on the edge) and/or to protect the wiring and/or to protect the edge of the glazing, especially the corners:
  the protective material may lie around the entire perimeter of the edge of the glazing and the protective material preferably has no external, especially opaque, surround (rigid frame, casing, fittings, etc.); and/or
  the protective material lies in a peripheral groove between the first and second glass sheets, framing the glazing and enclosing the wiring.

This provides a satisfactory finish, required for end-to-end installation and installation in door glazings. Moreover, the moulding acts to dampen shocks, especially protecting the corners of the glazing, an additional frame (fittings, etc.) not being necessary.

A transparent protective material such as EVA may be preferred, especially if it may be seen, for example in door applications.

This furthermore makes it possible to enhance and even replace the seal for the liquid crystals and for the electrodes which is provided by the interlayer sheets.

The cross section of the protective material forms an element sealing against liquid water and/or its lateral dimension is not necessarily the same everywhere on the perimeter. For example, the lateral dimension may be larger level with the electrical wiring.

For example, along the edge of the glazing, a first thickness is chosen, limited to 0.5 mm outside of the wiring input or inputs and to about 1.5 mm for the wiring input or inputs and even for the wiring regions along the edge. For each of the regions the thickness may be substantially constant.

Moreover, in one design of the invention, the wiring input lies along the edge and the protective material may be formed from the first interlayer film protruding from the first glass sheet (especially folded so as to surround the wiring), for example protruding by at least 7 mm, even more preferably by between 5 and 15 mm.

Naturally, the second interlayer film may preferably participate in the formation of the seal, and for example is made from EVA. It may protrude from the second glass sheet (and be folded to surround the wiring with the first interlayer film), for example protruding by at least 7 mm, even more preferably by between 5 and 15 mm.

Moreover, a (first and/or second) interlayer film protruding by at least 3 mm may suffice for the region or regions of the edge of the glazing without wiring (in the case of a protective material lying around the entire perimeter, especially a moulding). Moreover, the means for sealing the liquid crystals and first and second electrodes from water (liquid and vapour) is preferably produced by the peripheral encapsulation formed by the first and second thermoplastic materials.

To prevent any electrical malfunction such as a short circuit, or grounding of the electrodes or busbars, the glass sheets preferably protrude beyond the supports, for example by at least 3 mm.

It is not necessary for the second plastic, especially thermoplastic, material to be of the same nature as the first plastic, especially thermoplastic, material as long as these materials adhere well to each other. Naturally, it is simpler for them to be of similar or identical nature.

It is furthermore possible to envisage various current-carrying-lead configurations (busbar):
  a first current-carrying strip, especially a metal foil, lying along a first (lateral or vertical) end of the first or second support (with corners: rectangular, square, etc.) and a second current-carrying strip lying along an end opposite or adjacent the first end;
  a first current-carrying strip, especially a metal foil, lying along a first (lateral or vertical) end of the first or second support (with corners: rectangular, square, etc.) and a second current-carrying strip lying along the same end.

It is possible to envisage various wiring configurations:
  wiring (one or more wires) lying along a single (lateral or longitudinal) end of the edge of the glazing or on two adjacent or opposite ends of the edge of the glazing The first and/or second support is transparent. It may be chosen to be rigid or semi-rigid, for example to be made from glass, an acrylic such as polymethyl methacrylate PMMA, or polycarbonate PC. It may also be flexible and especially made from polyethylene terephthalate PET or from certain flexible polycarbonates.

Thus a possible structure is: PET/electrically conductive ITO film/polymer/electrically conductive ITO film/PET, which takes the form of an easily handled pliable sheet.

All NCAP (nematic curvilinear aligned phase), PDLC (polymer dispersed liquid crystal), CLC (cholesteric liquid crystal) and NPD-LCD (non-homogenous polymer dispersed liquid crystal display) liquid-crystal systems may in fact be used.

These systems may furthermore contain dichroic dyes, especially in solution in the liquid-crystal droplets. It is then also possible to modulate the light-scattering and light-absorption properties of the systems.

It is also possible to use, for example, gels based on cholesteric liquid crystals containing a small quantity of crosslinked polymer, such as those described in patent WO 92/19695. More generally, it is thus possible to select PSCT (polymer stabilized cholesteric texture) liquid-crystal systems.

Naturally, the liquid-crystal system may extend substantially over the entire area of the glazing (outside of a border area), or over (at least) a restricted region. The liquid-crystal system may be discontinuous and have several sections (pixels for example).

In the aforementioned wet areas, the glazing according to the invention may (also) be used:
- as an internal partition (between two rooms or in a space) in a building or in a terrestrial, aerial or nautical means of transportation (between two compartments, in a taxi, etc.);
- as a glazed door, a window, a ceiling or tiling (floor, ceiling);
- as a rear-view mirror of a vehicle, side windows or roof of a terrestrial, aerial or nautical means of transportation;
- as a projector screen; or
- as a shop window or a window of a counter.

Naturally, the glazing according to the invention may form all or part of a partition or other window (transom, etc.) or of a multiple glazing (addition of another glazing pane).

The glazing with liquid crystals according to the invention may be flat or curved, especially cylindrical, for example a sidewall of a shower cabinet.

The glass sheet or sheets are preferably substantially transparent over all or some of their area. They may optionally be tinted. A peripheral mirror may be provided on the frame of the glazing or on the ends, or else roughening or screen printing may be provided (on faces 1 and 4), to create a logo for example.

The electrodes may take the form of electrically conductive films, for example continuous films, deposited directly on the supports.

Thus, another subject of the invention is a process for manufacturing a laminated glazing with liquid-crystal-induced variable scattering, especially as described above, in which:
- a structure is provided comprising:
  - the first glass sheet;
  - the first lamination interlayer made from the first plastic, especially thermoplastic, material;
  - the electrically controllable, variable scattering system comprising the liquid crystals between the first support of the first electrode and the second support of the second electrode, the first and second electrodes making contact with the liquid crystals;
  - the second lamination interlayer made from the second plastic, especially thermoplastic, material of the first type;
  - the second glass sheet;
  - the electricity supply wiring with the first wiring input connected to the first link and the second wiring input connected to the second link; and
- means for sealing the first and second electrode links and the first and second wiring inputs from liquid water formed by the following steps:
  - the protective plastic polymer material is inserted (in any form: sheet, ball, etc.) into a mould having what is called an internal moulding surface facing the first and second wiring inputs;
  - the assembly is placed in a sealed vacuum system, the protective polymer material is heated until fluid so that the protective polymer material follows closely the moulding surface and makes contact with the first and second glass sheets, preferably with at least one edge of the glass sheet or sheets.

The moulding makes it possible to choose as required the dimensions and shape of the protective material.

With the mould, the protective polymer material will spread controllably. Thus the distribution of the material is defined by using a mould having a shape complementary to the shape desired for the seal and even for the mechanical protection of the wiring.

The mould preferably has a height greater than the total height of the glazing (in other words the total thickness of the glazing).

When the moulding occurs before the laminating, the mould is preferably kept in place (or another suitable element is substituted) on the perimeter of the glazing during lamination because, if the laminating plastic, especially thermoplastic, material overflows, it is then contained in the mould (or another suitable element).

According to the invention it is possible to limit the size of the polymer interlayer films, especially in the case of a complete moulding that then seals all the internal elements between the sheets of the glazing.

The two glass sheets may shift uncontrollably during assembly. This creates a dimensional disparity which causes problems during installation and may even lead to the glazing being scrapped.

When the moulding occurs before the laminating, the mould is kept in place on the perimeter of the glazing during laminating to preclude this drawback.

This is because, by encircling the glazing with the mould, the glass sheets are realigned when their edge faces butt against the mould.

Thus:
- the seal is guaranteed;
- the amount the glass sheets shift is limited;
- the edge finish will be selectively controlled depending on the shape of the mould (square, rounded, etc.); and
- an attractive finish is guaranteed.

Preferably, for rapid and easy manufacture and to obviate the aforementioned drawbacks, said heating furthermore fluidizes the first and second plastic, especially thermoplastic, materials so as to ensure the lamination preferably during the same heat treatment, and optionally the protective material makes contact with the first and second plastic, especially thermoplastic, materials.

A plastic material that does not need an autoclave treatment is preferred, so as to avoid the risk of degrading the liquid crystals, and it is enough simply to heat it. It is for this reason that EVA is preferred for the protective material and optionally for the first and second plastic, especially thermoplastic, materials (especially if continuity of materials is desired). Furthermore, EVA can flow sufficiently and can preferably be crosslinked (by inserting one or more crosslinking agents) during the oven treatment and/or thereafter.

Preferably:

for its retention: the mould lies along the edge of the glazing and presses against the glazing at least on an external face of the first sheet and optionally butts against the edge of the glazing and/or the mould encircles the perimeter of the glazing; and to allow the wiring to pass: the mould is opened or pierced with one or more holes in its sidewall facing the edge of the glazing so as to let the wiring exit and/or the mould is opened laterally on at least one side so as to let the wiring exit, and preferably the lateral sides of the mould are obstructed, especially using a fabric or an adhesive tape.

The mould (for example having an L-shaped cross section) may furthermore only press against one end of the main external face of the first sheet and a cover (textile, etc.) is placed on one edge of the main external face of the second sheet and extends over the mould.

The protective material is easily inserted between the mould and the end of the second sheet.

Furthermore, a given open mould (L-shaped, etc.) may be used for different thickness of glass, therefore the stock of moulds is simpler to manage.

By designing the mould appropriately, it is possible to create an additional space beyond the glass. This makes it possible to:

reinforce the input of the wiring and even all the wiring (increasing its ability to withstand tearing); and guide the wiring in a direction.

The invention finally provides a mould for the implementation of the process for manufacturing the laminated glazing with liquid-crystal-induced variable scattering described above.

The mould may have a surface to which the protective polymer material does not adhere, especially chosen from Teflon, i.e. polytetrafluoroethylene, or silicone.

The mould may have a cross section that is:

L-shaped as has already been seen; or

C-shaped: the protective material having a (symmetrical) C shape with smooth corners.

With a groove between the glass sheets, it is possible to insert the wiring into this groove. Optionally the moulding surface is then between the internal faces of the glass sheets, which has several advantages:

it eliminates the risk of creep in the protruding glass sheets;

it makes it possible to obtain a non-protruding protective material (for example flush with the edge);

it reinforces the protection of the wiring; and it reduces the lateral dimension of the glazing.

Other details and features of the invention will become clear with the following detailed description, given with regard to the appended drawings in which:

FIG. 3 shows a partial and schematic cross-sectional view of the manufacture of a laminated glazing with liquid crystals and sealed from water in a first embodiment according to the invention;

FIG. 4 shows a partial and schematic cross-sectional view of the laminated glazing with liquid crystals and sealed from water in this first embodiment according to the invention;

FIG. 5 shows a partial and schematic cross-sectional view of the manufacture of a laminated glazing with liquid crystals and sealed from water in a second embodiment according to the invention;

FIG. 5a shows a partial and schematic cross-sectional view of the laminated glazing with liquid crystals and sealed from water in this second embodiment according to the invention;

FIG. 6 shows a partial and schematic cross-sectional view of the manufacture of a laminated glazing with liquid crystals and sealed from water in a third embodiment according to the invention;

FIG. 6a shows a partial and schematic top view of the laminated glazing with liquid crystals and sealed from water of the third embodiment according to the invention;

FIG. 7 shows a partial and schematic top view of a laminated glazing with liquid crystals and sealed from water of a fourth embodiment according to the invention;

FIG. 7a shows a schematic top view of a laminated glazing with liquid crystals and sealed from water of a fifth embodiment according to the invention;

FIG. 8 shows a schematic top view of a laminated glazing with liquid crystals and sealed from water of a sixth embodiment according to the invention;

FIG. 9 shows a schematic top view of a laminated glazing with liquid crystals and sealed from water of a seventh embodiment according to the invention;

FIG. 10 shows a schematic top view of a laminated glazing with liquid crystals and sealed from water of an eighth embodiment according to the invention;

FIG. 11 shows a schematic top view of a laminated glazing with liquid crystals and sealed from water of a ninth embodiment according to the invention;

FIG. 12 shows a schematic top view of a laminated glazing with liquid crystals and sealed from water of a tenth embodiment according to the invention;

FIG. 13 shows a partial and schematic cross-sectional view of the manufacture of a laminated glazing with liquid crystals and sealed from water in an eleventh embodiment according to the invention;

FIG. 13a shows a partial and schematic cross-sectional view of the laminated glazing with liquid crystals and sealed from water in this eleventh embodiment according to the invention;

For the sake of clarity it is specified that the various elements of the objects shown are not necessarily to scale.

Figure 1:
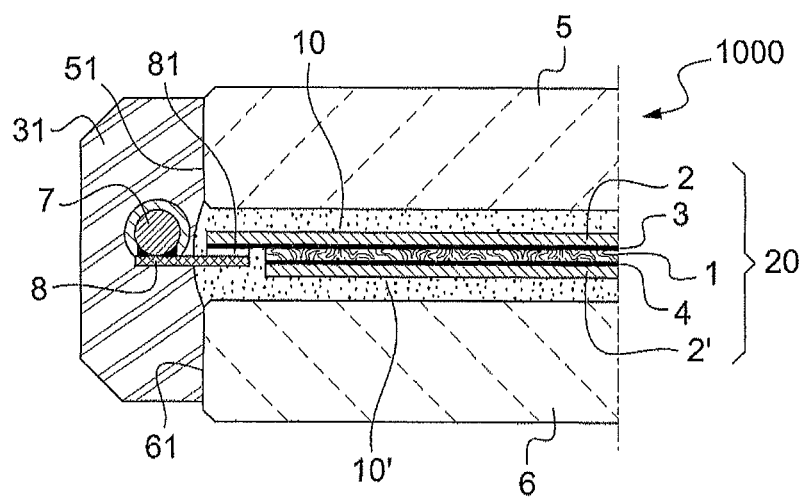
FIG. 1 shows a partial and schematic cross-sectional view of the prior-art laminated Privalite glazing with liquid crystals.

FIG. 1 shows a laminated glazing unit with liquid-crystal-induced variable scattering, a known type of glazing called Privalite glazing, which comprises:
- a first glass sheet 5 having an edge 51;
- a first interlayer film 10 for laminating the first glass sheet, made from EVA;
- an electrically controllable system 20 with variable optical properties comprising NCAP liquid crystals 1 between a first film 2, made from polyethylene terephthalate PET, supporting a first electrode 3, made from ITO and having a resistance per square of 75 ohms for a thickness of 30 nm, and a second film 2', made of PET, supporting a second electrode 4, made of ITO and having a resistance per square of 75 ohms for a thickness of 30 nm, the first and second electrodes making contact with the liquid crystals; and
- a second interlayer film 10', made from EVA, for laminating a second glass sheet 6 having an edge 61.

More precisely, the electrically controllable system consists of a transparent polymer film, in which microdroplets of a nematic liquid crystal have previously been dispersed, forming the liquid crystal emulsion that has a total thickness of about twenty microns, and which is sandwiched between the two PET sheets that are about 185 μm in thickness, each sheet being coated with electrodes.

Liquid-crystal molecules have several refractive indices: two ordinary indices $n_o$ in the two directions perpendicular to their axis of symmetry and one extraordinary index $n_e$ along the axis of symmetry. The polymer is chosen so as to have a refractive index very close to the ordinary index $n_o$. In the absence of voltage, the axes of the various droplets are not correlated with one another. The incident light is therefore highly refracted at each polymer/droplet interface because of the index difference between the polymer and the droplet the orientation of which is random. The light is therefore scattered in all directions.

Under a maximum voltage U0, the optical axes of the various droplets align in the electric field direction, i.e. perpendicularly to the glazing. The incident light, incident essentially normal to the glazing, now sees only a medium having a continuous index $n_p$ equal to $n_o$ and is no longer scattered.

Intermediate transparency states may be accessed at the speed desired by applying voltage values especially lying between 0 and U0. To do this, a dimmer is used.

Furthermore, this Privalite glazing comprises:
- as a first current-carrying lead, a first electrically conductive strip 81 in the form of a flexible copper foil (commonly called a busbar) fixed to the first electrode, along the end of the first supporting film that protrudes beyond the second supporting film and the liquid crystals for this purpose;
- a first link 8 to the first electrode in the form of a fixedly soldered rigid brass tab, protruding laterally from the edge of the glazing;
- as a second current-carrying lead, a second busbar (not shown) fixed to the second electrode, along the end of the second supporting film that protrudes beyond the first film and the liquid crystals for this purpose (on the opposite edge); and
- a second link 8 to the second electrode in the form of a fixedly soldered rigid brass tab protruding laterally from the edge of the glazing.

The glazing then comprises:
- electrical wiring 7 with two wires and therefore two wiring inputs: a first wiring input 70 connected to the first link 8 and a second wiring input (not shown) connected to the second link, inputs for wiring that is stripped and soldered to the tabs 8;
- a first bead 31 making contact with the edges 51, 61 of the first and second glass sheets and with a hot-melt adhesive, made from polyolefin as already mentioned, embedding the first wiring input 7, a bead that extends about 3.5 cm along the edge of the glazing; and
- a second bead (not shown) making contact with the edges 51, 61 of the first and second glass sheets and with a hot-melt adhesive, made from polyolefin as already mentioned, embedding the second wiring input 7, a bead that extends about 3.5 cm along the edge of the glazing.

The liquid-crystal film, the electrodes and the busbars are protected by the EVA sheets, which are larger than the PET sheets and the liquid-crystal film.

The beads 31 are easily torn off and do not adhere well to the glass sheets 5, 6: in a wet atmosphere the tabs (then the wiring) are then damaged leading to electrical faults.

The two beads 31, protruding 5 mm locally along the edge, may furthermore create a sizing issue, hindering installation especially in end-to-end configurations.

Figure 2:
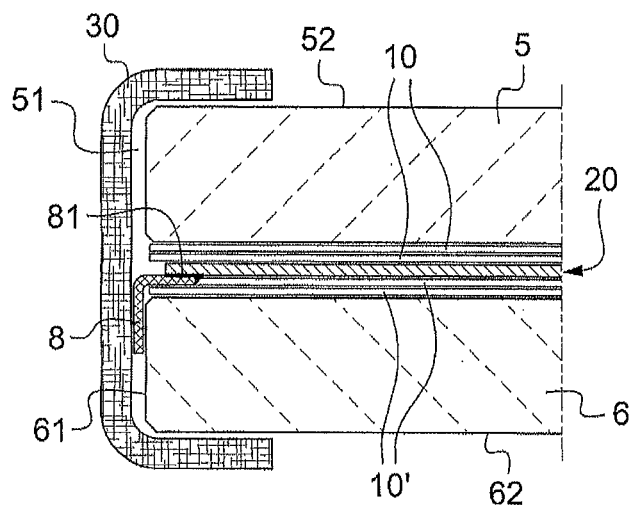
FIG. 2 shows a partial and schematic cross-sectional view of the manufacture of the prior-art Privalite glazing shown in FIG. 1.

Up to now, as shown in FIG. 2, during lamination of this Privalite glazing, a fabric strip 30 is fitted and surrounds the glazing 1000 on the edge face so as to retain the flowing EVA interlayers.

During the heat treatment, the brass tabs 8 become curved. To prevent the EVA from covering these tabs, each tab is covered with the adhesive. The brass tabs 8 are straightened after the lamination and this strip is removed and the wires are then soldered and the wiring inputs are encased in the hot-melt resin using a hot-melt injection technique.

The manufacturing process is long and expensive.

The edge finish furthermore remains unpredictable and may possibly lead to installation difficulties.

FIG. 3 shows a partial schematic cross-sectional view of the manufacture of a laminated glazing with liquid crystals and sealed from water in a first embodiment according to the invention.

To produce the laminated glazing with liquid-crystal-induced variable scattering, especially the seal of the electrical wiring against liquid water (and the lamination), the following steps are carried out:
- a structure is provided comprising:
    - the first glass sheet 5, for example made of a rectangle of clear soda-lime-silica glass measuring 1 m by 2.5 m and 5 mm in thickness;
    - the first EVA lamination interlayer 10—here comprising several sheets, for example having dimensions that are smaller than or equal to those of the glass sheet 5;
    - the electrically controllable variable scattering system 20 comprising:
        - a first film 2, made from polyethylene terephthalate PET, supporting a first electrode 3, for example a transparent conductive (single or multilayer) film, such as an ITO film, having a resistance per square of 75 ohms for a thickness of 30 nm, the support being offset by 3 mm from the glass sheet 5;
        - a second PET film 2', supporting a second transparent electrode 4, for example a transparent conductive (single or multilayer) film, such as an ITO film, having a resistance per square of 75 ohms for a thickness of 30 nm, the support being offset by 3 mm from the glass sheet 4, the first and second electrodes making contact with the liquid crystals;

the second EVA lamination interlayer 10, here comprising several sheets; and the second glass sheet 6 for example made of a rectangle of clear soda-lime-silica glass measuring 1 m by 2.5 m and 5 mm in thickness;

Furthermore, as in the prior art, the glazing comprises:

as a first current-carrying lead, a first busbar 81 fixed to the first electrode, along the end of the first supporting film that protrudes beyond the second supporting film and the liquid crystals for this purpose;

a first link 8 to the first electrode in the form of a fixedly soldered rigid brass tab, protruding laterally from the edge of the glazing;

as a second current-carrying lead, a second busbar (not shown) fixed to the second electrode, along the end of the second supporting film that protrudes beyond the first film and the liquid crystals for this purpose (on the opposite edge); and a second link 8 to the second electrode in the form of a fixedly soldered rigid brass tab protruding laterally from the edge of the glazing.

The glazing also comprises, before the seal (even before the lamination) electrical wiring 7 comprising a two-wire cable (or two wires) with two wiring inputs: a first wiring input 70 connected to the first link 8 and a second wiring input (not shown) connected to the second link, in fact inputs for wiring that is stripped and soldered to the tabs 8.

The cable or wires are chosen to be thinner than the glazing.

To protect the first wiring input 7, the thermoplastic protective polymer material 15, made from EVA and preferably crosslinkable using agents such as organic peroxider, is inserted in the form of strips—or as a variant in the form of balls—into a mould 40 having an internal surface called a moulding internal surface facing this first wiring input. The width of the strips depends on the thickness of the glass sheets used. It is preferable to completely cover the edges 51, 61 with moulded EVA.

The polymer material 15 fills the space between the moulding surface 18 and the edges 51, 61.

For example 4 to 5 strips of 0.4 mm thick EVA are used to cover the (exposed) wire 8 having a core cross section equal to 0.6 $mm^2$, the total diameter including the internal sheath being 2 mm. The total diameter with the external sheath is 5.5 mm.

For the second wiring input 7, the same mould or another mould is used, as will be explained below.

The mould, having a (substantially) C-shaped cross section, lies along the edge of the glazing and presses against the glazing via the external faces of the first and second glass sheets 5, 6 and butts against the edges 51, 61 via steps internal to the mould.

The mould is open laterally on at least one side to allow the wire to exit along the edge. The lateral ends of the mould are closed off or obstructed especially using a fabric or an adhesive tape (not shown).

As a variant, the mould has one or more sidewalls that are pierced to allow the wiring to exit.

The mould has a surface to which EVA does not adhere, for example Teflon i.e. polytetrafluoroethylene.

The assembly is placed in a vacuum-sealed chamber which is pumped to a rough vacuum in order to degas the EVA (removal of bubbles, etc.) and heated above 100° C. in order to fluidize the EVA protective polymer material, so that the EVA material closely follows the moulding surface and makes contact with the edges 51, 61, and to start crosslinking the EVA.

This thus forms the means for sealing the first and second electrode links 8 and the first and second wiring inputs 8 from liquid water.

In this embodiment, the heating furthermore fluidizes the first and second EVA interlayer material so as to produce the lamination during the same heat treatment.

The EVA 15 closely follows the moulding surface and, the wiring being offset from the edge 51, 61, embeds the wiring input. The EVA 10, 10' may also make contact with the wiring input and/or the protective material.

If the wiring is against the glazing, the wiring input is covered at least on the external side.

In a variant that is not shown, EVA strips are not used and the films 10, 10' are made to protrude so as to surround the wire.

The glazing 100 shown in FIG. 4 is therefore provided with a peripheral seal 9 against liquid water, made from moulded EVA, having a smooth external surface.

This thus seals both the busbars and the solder joints of the cables

The seal against liquid water is qualified by defining the second figure of the protection index (IP).

The protection index (IP) is an international standard of the International Electrotechnical Commission. This index classifies the level of protection provided by a material against the ingress of solid and liquid bodies. The format of the index, given in standard CEI 60529, is IP XY, where the letters XY are two numbers and/or a letter. When no criterion is met, the figure may be replaced by the letter X. The second figure Y therefore relates to the level of protection against water under the conditions summarized in Table 1 below.

TABLE 1

| Index | 2nd figure: protection against water |
|---|---|
| 0 | No protection |
| 1 | Protected against water droplets falling vertically |
| 2 | Protected against water droplets falling at up to 15° from vertical |
| 3 | Protected against rain at up to 60° from vertical |
| 4 | Protected against discharges of water from all directions |
| 5 | Protected against jets of water from all directions from hoses |
| 6 | Protected against large waves |
| 7 | Protected against the effects of immersion |

This coefficient is defined for example in standards DIN40050, IEC 529 and BS 5490.

The glazing 100 (as for all the glazing of the following examples according to the invention) meets the IPX7 standard, i.e. the glazing has been shown to operate whilst completely immersed in water (test described by the standard IEC 60335-1:2002). The immersion is temporary and at a depth of between 0.15 m and 1 m. More precisely, the test was carried out by completely immersing the glazing in water in its manufacturer-recommended installation configuration, the following conditions being respected:

a) the glazing was horizontal at a depth of 1 m and supplied with electrical power;

b) the test lasted for 30 min; and c) the temperature of the water did not differ from that of the glazing by more than 5 K.

The inputs of the embedded wires also have a better withstand. The resistance of the wire to being torn off may be established using the following method.

The wire is marked where it exits the mould and it is subjected to a tensile force of 100 N (10 kg) at a distance of about 20 mm from the wire input. The wire is subjected to a 100 N tensile force for 1 s without shaking, in the least favourable direction. The test is performed 25 times. Then the wire is subjected to a torque of 0.35 N.m applied as close as possible to the input of the glazing for 1 min, During the tests the wire must not be damaged, i.e. be severed by the torque. The tensile force is again applied and the longitudinal displacement of the wire must not be more than 2 mm.

In a second embodiment, the method of manufacturing shown in FIG. 5 differs from the first embodiment in that the wire 7 is inserted into a peripheral groove 53 provided by a step in the internal face of the first glass sheet 5. The tabs 8 also stop in this groove, not protruding beyond the edge of the glazing in this configuration. Furthermore, the mould 40' has no internal steps.

For example, fewer EVA strips 15 are used for the seal, for example two strips. Preferably a moulding surface is preserved opposite the edges of the glazing but the thickness of the extension to the glazing 200 obtained in this second embodiment, and shown in FIG. 5a, is reduced.

In a variant that is not shown, the mould is inserted between the internal faces of the glass sheets 5, 6.

In a third embodiment, the manufacturing process shown in FIG. 6 differs from the first embodiment in that the mould, having an L-shaped cross section, is open and therefore touches only one end of the main external face of the first sheet 5. A cover (a strip of adhesive-coated fabric for example or a strip of fabric fixed using adhesive tape) is placed on one end of the main external face of the second sheet and extends over the mould 40" so as to cap it.

In all the top views presented below the glass sheet 6 and the interlayer 10' have been left out for the sake of clarity.

FIG. 6a shows a partial schematic top view (from the side of the second support 2') of the laminated glazing 210 with liquid crystals and sealed against water, in a third embodiment according to the invention (after the laminating operation but before removal of the mould) especially illustrating the seal of the two wiring inputs and the arrangement of the links.

The first and second busbars 81, 82 lie along the same end, for example a lateral end, after installation, localized in a cut-out region of the second support and liquid-crystal film and localized in a cut-out region (dashed lines) of the first support and liquid-crystal film, respectively.

The first and second brass tabs 8, 8' are spaced apart for example by 15 cm (approximately the same distance as the opposed ends of the busbars).

The open mould 40" lies opposite the two inputs 70, 72 of the two-wire cable 7 on the tabs 8, 8'. The protective material 9 therefore covers continuously these inputs and the tabs 8, 8' and the space between these tabs.

The mould extends slightly beyond the inputs 70, 72 and thus the protective material 9 also covers a part of the internal sheaths 71, 73 and the end of the common external sheath 74, guiding the cable 7.

The two-wire cable exits the mould 40" via one single side (at either end of a lateral fabric 42) and it is unidirectional.

FIG. 7 shows a partial schematic top view of the laminated glazing 300 with liquid crystals and sealed against water, in a fourth embodiment according to the invention (after the laminating operation but before removal of the mould) especially illustrating the seal of the two wiring-inputs and the arrangement of the links.

The first and second busbars 81, 82 lie along two opposite ends of the edges 51, 61, for example lateral ends after installation, the first busbar 81 being localized in a cut-out region of the second support and liquid-crystal film and the second busbar 82 being localized in a cut-out region (dashed lines) of the first support and liquid-crystal film.

The mould 40 extends along one end adjacent these two edge faces 51, 61, for example the top end after installation.

The mould of U-shaped cross section lies opposite the two inputs 70, 72 of the two-wire cable 7 on the tabs 8, 8' protruding beyond this top end. The protective material (9) therefore covers continuously these inputs and the tabs 8, 8' and the space between these tabs. The mould is pierced so that the external sheath 74 of the two-wire cable may exit towards the electricity supply (mains, etc.).

The protective material 9 also covers the exposed internal sheaths 71, 73 and the end of the common external sheath 74.

The two-wire cable on exiting the mould 40 is unidirectional.

FIG. 7a shows a schematic top view of the laminated glazing 310 with liquid crystals and sealed against water, in a fifth embodiment according to the invention (after the laminating operation and after removal of the mould) especially illustrating the seal of the two wiring inputs and the arrangement of the links.

The first and second busbars 81, 82 lie along a single end of the edges 51, 61, for example the top end after installation, the first busbar 81 being localized in a cut-out region of the second support and liquid-crystal film and the second busbar 82 being localized in a cut-out region (dashed lines) of the first support and liquid-crystal film.

The protective material 9 covers continuously the inputs of the two-wire cable and the tabs 8, 8' and the space between these tabs. The mould is pierced so that the external sheath 74 of the two-wire cable may exit towards the electricity supply (mains, etc.)

The protective material 9 also covers the exposed internal sheaths 71, 73 and the end of the common external sheath 74.

The two-wire cable on exiting the moulded EVA 9 is unidirectional until it reaches its mains connection 75.

FIG. 8 shows a schematic top view of the laminated glazing 400 with liquid crystals and sealed against water, in a sixth embodiment according to the invention (after the laminating operation and after removal of the mould) especially illustrating the seal of the two wiring inputs and the arrangement of the links.

This glazing 400 differs from the glazing 210 in the configuration of the wire, especially in that the external sheath is curved after the moulded EVA and exits from the moulded EVA via the moulded surface facing the edge 51, 61.

FIG. 9 shows a schematic top view of the laminated glazing 500 with liquid crystals and sealed against water, in a seventh embodiment according to the invention (after the laminating operation and after removal of the mould) especially illustrating the seal of the two wiring inputs and the arrangement of the links.

This glazing 500 is similar to the glazing 210, however the moulding surface is smoother on the top face because the mould used was a closed, single-part, C-shaped mould.

FIG. 10 shows a schematic top view of the laminated glazing 600 with liquid crystals and sealed against water, in an eighth embodiment according to the invention (after the laminating operation and after removal of the mould) especially illustrating the seal of the two wiring inputs and the arrangement of the links.

This glazing 600 differs from the glazing 500 in the extent of the moulding, which here extends along the entire lateral end, and in the greater distance between the tabs 8, 8', due to the location of the busbars 81, 82 along the top and bottom ends.

FIG. 11 shows a schematic top view of the laminated glazing 700 with liquid crystals and sealed against water, in a ninth embodiment according to the invention (after the laminating operation and after removal of the mould) especially illustrating the seal of the two wiring inputs and the arrangement of the links.

This glazing 700 differs from the glazing 600 in the reduced distance between the tabs 8, 8' and in the location of the busbars 81, 82 along the (left) lateral edge.

FIG. 12 represents a schematic top view of a glazing 800 with liquid crystals and sealed against water, in a tenth embodiment according to the invention.

This glazing 800 differs from the glazing 600 in:
the location of the busbars 81, 82 in two separate regions on two opposite lateral ends;
the location of the tabs 8, 8' on the top end and on the lateral end, respectively;
the position of the second wire 72 with its internal sheath 73 on the top end; and in that
the moulded EVA lies on the lateral end and the top end of the edge 51, 61 of the glazing.

FIG. 13 shows a partial schematic cross-sectional view of the manufacture of a glazing unit with liquid crystals and sealed against water, in an eleventh embodiment according to the invention The manufacturing process shown in FIG. 13 differs from the first embodiment in that the mould completely encircles the glazing.

Thus even the wireless regions of the edge are covered with moulded EVA. In these regions it is possible to use less EVA, for example a single strip of EVA 0.4 mm in thickness.

FIG. 13*a* shows a partial schematic cross-sectional view of the glazing with liquid crystals and sealed against water, in this eleventh embodiment. The moulded EVA 9 joins with the lamination EVA 10, 10'.

Figure 14:
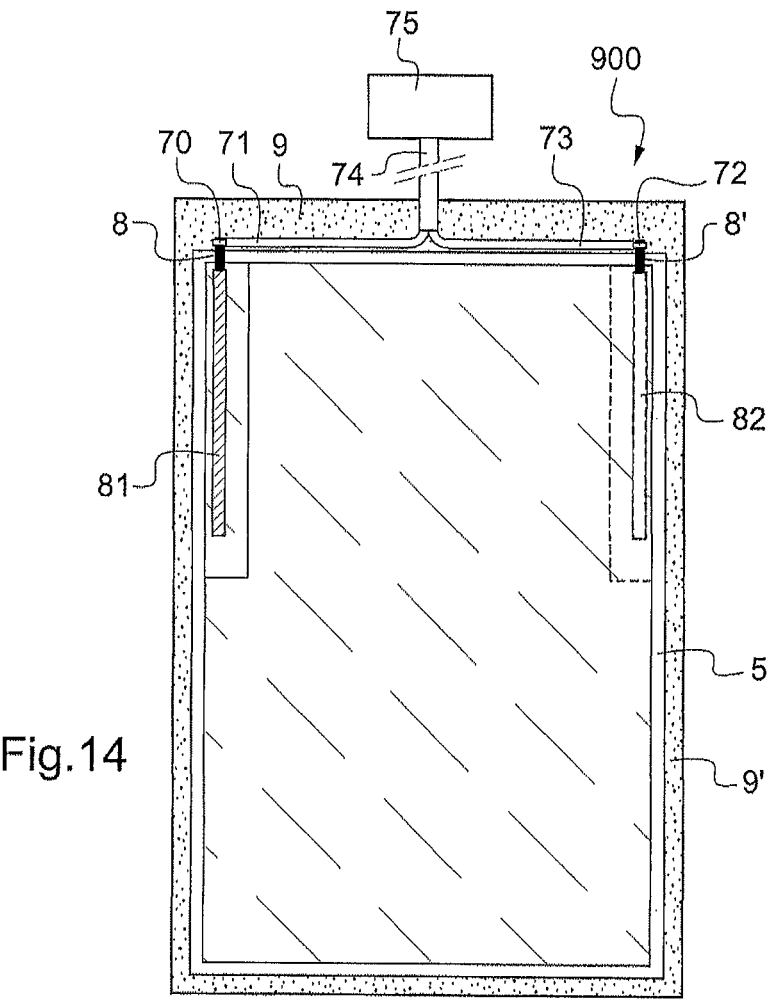
FIG. 14 shows a schematic top view of a laminated glazing with liquid crystals and sealed from water of the eleventh embodiment according to the invention.

FIG. 14 shows a schematic top view of the laminated glazing with liquid crystals and sealed against water, in this eleventh embodiment according to the invention showing the variable-thickness, moulded EVA encircling the glazing.

Figure 15:
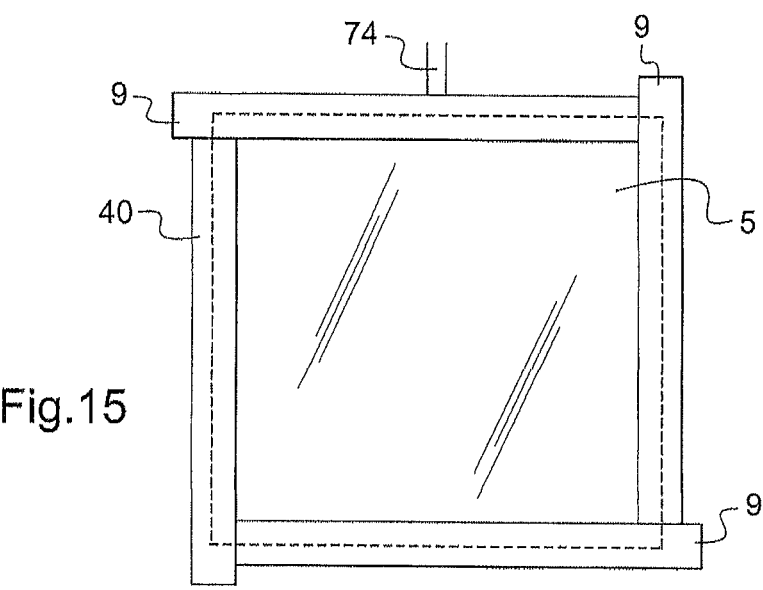
FIG. 15 shows a schematic top view of the manufacture of the laminated glazing with liquid crystals and sealed from water of the eleventh embodiment according to the invention.

FIG. 15 shows a schematic top view of the manufacture of the laminated glazing with liquid crystals and sealed against water of the eleventh embodiment according to the invention.

The mould 40 is in four pieces, each with a free lateral end and an end that butts against an end of another piece.

Figure 16:
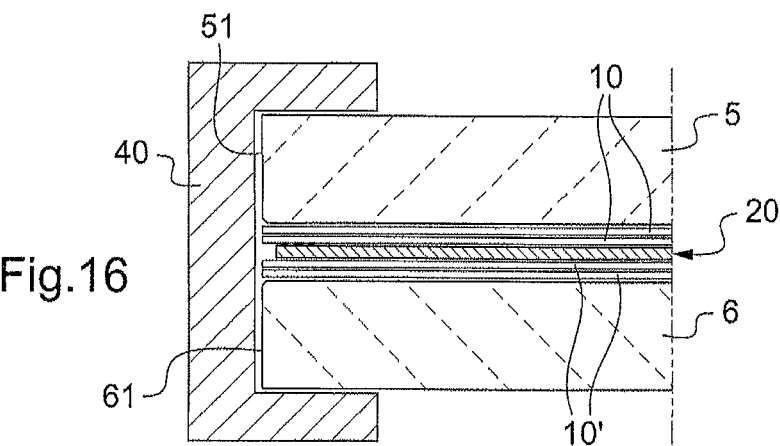
FIG. 16 shows a partial and schematic cross-sectional view of the manufacture of a laminated glazing with liquid crystals and sealed from water in a twelfth embodiment according to the invention.

FIG. 16 shows a partial schematic cross-sectional view of the manufacture of a laminated glazing with liquid crystals and sealed against water in a twelfth embodiment according to the invention.

This process varies from the process in FIG. 13 in that, outside of the wiring region, no EVA is added between the internal moulding surface 40 and the edge 51, 61.

Figure 16A:
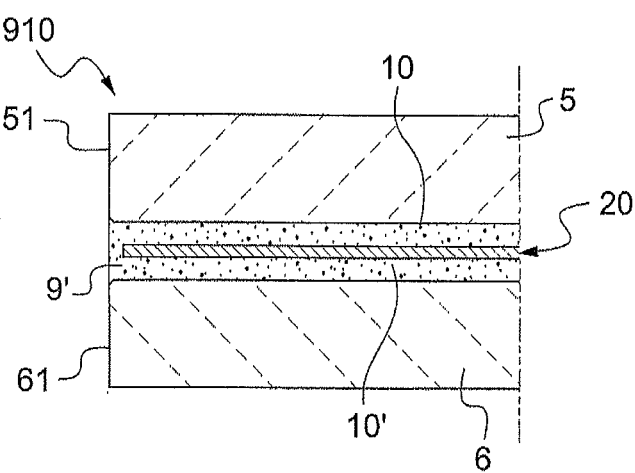
FIG. 16a shows a partial and schematic cross-sectional view of the laminated glazing with liquid crystals, and sealed from water in a twelfth embodiment according to the invention.

FIG. 16*a* represents a partial schematic cross-sectional view of the glazing with liquid crystals and sealed against water in the twelfth embodiment according to the invention.

This glazing 700 differs from the glazing 600 in that the moulding is flush with the glass sheets outside of the wiring region(s) and is obtained using the EVA lamination interlayers 10, 10' only.

The invention claimed is:

1. A laminated glazing with variable liquid-crystal-induced scattering, the laminated glazing comprising:
   a first glass sheet and a second glass sheet, wherein there is a peripheral groove between the first glass sheet and the second glass sheet;
   a first electrode and a second electrode positioned between the first glass sheet and the second glass sheet;
   an electrically controllable, variable scattering system comprising liquid crystals, the first and second electrodes making contact with the liquid crystals;
   first and second electrically conductive links, to the first and second electrodes respectively;
   electrical wiring with two wiring inputs, a first wiring input electrically connected to the first electrically conductive link and a second wiring input electrically connected to the second electrically conductive link, wherein at least a portion of the electrical wiring is positioned in the peripheral groove; and
   a polymer material, for protecting the first and second wiring inputs, which makes contact with the first and second glass sheets;
   wherein the protective polymer material is positioned in the peripheral groove and forms a seal configured to seal the first and second electrically conductive links, the electrical wiring positioned in the peripheral groove, and the first and second wiring inputs from liquid water.

2. The laminated glazing according to claim 1, wherein the protective material is crosslinked.

3. The laminated glazing according to claim 1, wherein the protective material is based on ethylene-vinyl acetate.

4. The laminated glazing according to claim 1, wherein the protective material has an external surface, directed towards the exterior of the glazing, which is moulded.

5. The laminated glazing according to claim 1, wherein the electrical wiring comprises a wire that, over at least some of its a length thereof located outside of an input region of the wire, comprises a sheath that makes contact with the protective material.

6. The laminated glazing according to claim 1, wherein the electrical wiring comprises a wire fixed in a defined unidirectional position at least outside of the input of the wire, said input being covered with the protective material.

7. The laminated glazing according to claim 1, wherein the protective material covers continuously the first and second electrically conductive links and a space between the first and second links.

8. The laminated glazing according to claim 1, wherein the wiring exits the glazing, not covered by the protective material, in a single region.

9. The laminated glazing according to claim 1, wherein the protective material lies around an entire perimeter of the glazing, framing the glazing and enclosing the electrical wiring.

10. A method comprising arranging the laminated glazing with variable liquid-crystal-induced scattering, according to claim 1, as:
   an internal partition in a building or in a terrestrial, aerial or nautical object of transportation;
   a glazed door, a window, a ceiling or a tiling; a rear-view mirror of a vehicle, side windows or roof of a terrestrial, aerial or nautical object of transportation;
   a projector screen; or
   a shop window or a window of a counter.

11. A process for manufacturing a laminated glazing with liquid-crystal-induced variable scattering, according to claim 1,
the process comprising forming a seal for sealing the first and second electrically conductive links and the first and second wiring inputs from liquid water, the forming comprising:
inserting the protective polymer material into a mould having an internal moulding surface facing the first and second wiring inputs;
placing the assembly in a sealed vacuum system, and heating the protective polymer material until fluid so that the protective polymer material follows closely the moulding surface and makes contact with the first and second glass sheets.

12. The process for manufacturing the laminated glazing with liquid-crystal-induced variable scattering, according to claim 11, wherein the protective material is based on ethylene-vinyl acetate, and the first and second thermoplastic materials are based on ethylene-vinyl acetate.

13. The process for manufacturing the laminated glazing with liquid-crystal-induced variable scattering, according to claim 11, wherein the mould lies along the edge of the glazing and presses against the glazing at least on an external face of the first glass sheet.

14. The process for manufacturing the laminated glazing with liquid-crystal-induced variable scattering, according to claim 11, wherein the mould encircles the perimeter of the glazing.

15. The process for manufacturing the laminated glazing with liquid-crystal-induced variable scattering, according to claim 11, wherein the mould is opened or pierced with one or more holes in a sidewall thereof facing the edge of the glazing so as to let the wiring exit.

16. The process for manufacturing the laminated glazing with liquid-crystal-induced variable scattering, according to claim 11, wherein the mould is opened laterally on at least one side so as to let the wiring exit.

17. The process for manufacturing the laminated glazing with liquid-crystal-induced variable scattering, according to claim 11, wherein the mould presses against the main external faces of the glazing.

18. The process for manufacturing the laminated glazing with liquid-crystal-induced variable scattering, according to claim 11, wherein the mould only presses against one end of the main external face of the first sheet and a cover is placed on one edge of the main external face of the second sheet and extends over the mould.

19. The laminated glazing according to claim 1, wherein the peripheral groove comprises a step formed in the first glass sheet.

20. The laminated glazing according to claim 19, wherein the second glass sheet is planar opposite the step, thereby defining a rectangular-shaped peripheral groove between the first glass sheet and the second glass sheet.

* * * * *